(12) United States Patent
Park et al.

(10) Patent No.: US 7,532,548 B2
(45) Date of Patent: May 12, 2009

(54) METHOD AND APPARATUS FOR MANAGING OVERWRITE ON AN OPTICAL DISC WRITE ONCE

(75) Inventors: Yong Cheol Park, Gwachon-si (KR); Sung Dae Kim, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 452 days.

(21) Appl. No.: 10/731,093

(22) Filed: Dec. 10, 2003

(65) Prior Publication Data

US 2004/0114474 A1 Jun. 17, 2004

(30) Foreign Application Priority Data

| Dec. 11, 2002 | (KR) | ........................ 10-2002-0078889 |
| Jan. 27, 2003 | (KR) | ........................ 10-2003-0005212 |
| Feb. 17, 2003 | (KR) | ........................ 10-2003-0009896 |
| Mar. 3, 2003 | (KR) | ........................ 10-2003-0013199 |
| Jul. 4, 2003 | (KR) | ........................ 10-2003-0045316 |

(51) Int. Cl.
*G11B 7/085* (2006.01)
*G11B 21/08* (2006.01)

(52) U.S. Cl. .................................. 369/30.03
(58) Field of Classification Search .............. None
See application file for complete search history.

(56) References Cited

U.S. PATENT DOCUMENTS

| 4,558,446 A | 12/1985 | Banba et al. |
| 4,733,386 A | 3/1988 | Shimoi |
| 4,807,205 A | 2/1989 | Picard et al. |
| 4,963,866 A | 10/1990 | Duncan |
| 5,068,842 A | 11/1991 | Naito et al. |
| 5,111,444 A | 5/1992 | Fukushima et al. |
| 5,210,734 A | 5/1993 | Sakurai et al. |
| 5,235,585 A | 8/1993 | Bish et al. |
| 5,237,553 A | 8/1993 | Fukushima et al. |
| 5,247,494 A | 9/1993 | Ohno et al. |
| 5,319,626 A | 6/1994 | Ozaki et al. |

(Continued)

FOREIGN PATENT DOCUMENTS

CN 1134017 A 10/1996

(Continued)

OTHER PUBLICATIONS

JIS handbook data processing for hardware, Japan, Japanese Standards Association Inc., Apr. 21, 1999, pp. 1064-1070.

(Continued)

*Primary Examiner*—Joseph H Feild
*Assistant Examiner*—Parul Gupta
(74) *Attorney, Agent, or Firm*—Birch, Stewart, Kolasch & Birch, LLP

(57) ABSTRACT

A method of managing overwrite on an optical disc write once, makes it possible to perform a physical overwrite on the optical disc write once and maintains the continuity of a user data area after performing the physical overwrite. The method includes replacement-recording data, which is requested to be overwritten in a specified area of the disc where recording is completed, from a rear of a user data area of the disc, and recording information in a last recordable position of the user data area, which is changed in accordance with the replacement recording operation, in a management area of the disc.

18 Claims, 14 Drawing Sheets

U.S. PATENT DOCUMENTS

| | | | |
|---|---|---|---|
| 5,404,357 A | 4/1995 | Ito et al. | |
| 5,442,611 A | 8/1995 | Hosaka et al. | |
| 5,448,728 A * | 9/1995 | Takano et al. | 707/205 |
| 5,475,820 A | 12/1995 | Natrasevschi et al. | |
| 5,481,519 A | 1/1996 | Hosoya et al. | |
| 5,495,466 A | 2/1996 | Dohmeier et al. | |
| 5,528,571 A | 6/1996 | Funahashi et al. | |
| 5,553,045 A | 9/1996 | Obata et al. | |
| 5,577,194 A | 11/1996 | Wells et al. | |
| 5,608,715 A | 3/1997 | Yokogawa et al. | |
| 5,715,221 A | 2/1998 | Ito et al. | |
| 5,720,030 A | 2/1998 | Kamihara et al. | |
| 5,740,435 A | 4/1998 | Yamamoto et al. | |
| 5,745,444 A | 4/1998 | Ichikawa et al. | |
| 5,799,212 A | 8/1998 | Ohmori et al. | |
| 5,802,028 A | 9/1998 | Igarashi et al. | |
| 5,805,536 A | 9/1998 | Gage et al. | |
| 5,848,038 A | 12/1998 | Igarashi et al. | |
| 5,867,455 A * | 2/1999 | Miyamoto et al. | 369/30.05 |
| 5,878,020 A | 3/1999 | Takahashi | |
| 5,914,928 A | 6/1999 | Takahashi et al. | |
| 5,940,702 A | 8/1999 | Sakao et al. | |
| 6,058,085 A | 5/2000 | Obata et al. | |
| 6,118,608 A | 9/2000 | Kakihara et al. | |
| 6,138,203 A | 10/2000 | Inokuchi et al. | |
| 6,160,778 A | 12/2000 | Ito et al. | |
| 6,189,118 B1 | 2/2001 | Sasaki et al. | |
| 6,233,654 B1 | 5/2001 | Aoki et al. | |
| 6,292,445 B1 * | 9/2001 | Ito et al. | 369/47.14 |
| 6,341,109 B1 | 1/2002 | Kayanuma et al. | |
| 6,341,278 B1 | 1/2002 | Yamamoto et al. | |
| 6,373,800 B1 | 4/2002 | Takahashi et al. | |
| 6,405,332 B1 | 6/2002 | Bando et al. | |
| 6,414,923 B1 | 7/2002 | Park et al. | |
| 6,447,126 B1 | 9/2002 | Hornbeck | |
| 6,466,532 B1 | 10/2002 | Ko et al. | |
| 6,469,978 B1 | 10/2002 | Ohata et al. | |
| 6,477,126 B1 | 11/2002 | Park et al. | |
| 6,480,446 B1 | 11/2002 | Ko et al. | |
| 6,493,301 B1 | 12/2002 | Park et al. | |
| 6,496,807 B1 | 12/2002 | Inokuchi et al. | |
| 6,529,458 B1 | 3/2003 | Shin et al. | |
| 6,542,450 B1 | 4/2003 | Park et al. | |
| 6,564,345 B1 | 5/2003 | Kim et al. | |
| 6,581,167 B1 | 6/2003 | Gotoh et al. | |
| 6,606,285 B1 | 8/2003 | Ijtsma et al. | |
| 6,615,363 B1 | 9/2003 | Fukasawa et al. | |
| 6,631,106 B1 | 10/2003 | Numata et al. | |
| 6,633,724 B1 | 10/2003 | Hasegawa et al. | |
| 6,667,939 B1 | 12/2003 | Miyamoto et al. | |
| 6,671,249 B2 | 12/2003 | Horie et al. | |
| 6,697,306 B2 | 2/2004 | Sako et al. | |
| 6,714,502 B2 | 3/2004 | Ko et al. | |
| 6,724,701 B2 | 4/2004 | Ijtsma et al. | |
| 6,738,341 B2 | 5/2004 | Ohata et al. | |
| 6,754,860 B2 | 6/2004 | Kim et al. | |
| 6,760,288 B2 | 7/2004 | Ijtsma et al. | |
| 6,763,429 B1 | 7/2004 | Hirayama et al. | |
| 6,766,418 B1 | 7/2004 | Alexander et al. | |
| 6,785,206 B1 | 8/2004 | Lee et al. | |
| 6,788,631 B1 * | 9/2004 | Park et al. | 369/53.15 |
| 6,795,389 B1 | 9/2004 | Nishiuchi et al. | |
| 6,804,797 B2 | 10/2004 | Ko et al. | |
| 6,826,140 B2 | 11/2004 | Brommer et al. | |
| 6,842,580 B1 | 1/2005 | Ueda et al. | |
| 6,845,069 B2 | 1/2005 | Nakahara et al. | |
| 6,883,111 B2 | 4/2005 | Yoshida et al. | |
| 6,918,003 B2 | 7/2005 | Sasaki et al. | |
| 6,934,236 B2 | 8/2005 | Lee et al. | |
| 6,999,398 B2 | 2/2006 | Yamamoto et al. | |
| 7,002,882 B2 | 2/2006 | Takahashi et al. | |
| 7,027,059 B2 | 4/2006 | Hux et al. | |
| 7,027,373 B2 | 4/2006 | Ueda et al. | |
| 7,042,825 B2 | 5/2006 | Yamamoto et al. | |
| 7,050,701 B1 | 5/2006 | Sasaki et al. | |
| 7,092,334 B2 | 8/2006 | Choi et al. | |
| 7,123,556 B2 * | 10/2006 | Ueda et al. | 369/47.14 |
| 7,149,930 B2 | 12/2006 | Ogawa et al. | |
| 7,161,879 B2 | 1/2007 | Hwang et al. | |
| 7,184,377 B2 | 2/2007 | Ito et al. | |
| 7,188,271 B2 | 3/2007 | Park et al. | |
| 7,233,550 B2 | 6/2007 | Park et al. | |
| 7,236,687 B2 | 6/2007 | Kato et al. | |
| 7,272,086 B2 | 9/2007 | Hwang et al. | |
| 7,289,404 B2 | 10/2007 | Park et al. | |
| 7,296,178 B2 | 11/2007 | Yoshida et al. | |
| 7,313,066 B2 | 12/2007 | Hwang et al. | |
| 7,327,654 B2 | 2/2008 | Hwang et al. | |
| 7,349,301 B2 | 3/2008 | Terada et al. | |
| 7,379,402 B2 | 5/2008 | Ko et al. | |
| 2001/0009537 A1 | 7/2001 | Park | |
| 2001/0011267 A1 | 8/2001 | Kihara et al. | |
| 2001/0026511 A1 | 10/2001 | Ueda et al. | |
| 2001/0043525 A1 | 11/2001 | Ito et al. | |
| 2002/0025138 A1 | 2/2002 | Isobe et al. | |
| 2002/0097665 A1 | 7/2002 | Ko et al. | |
| 2002/0097666 A1 | 7/2002 | Ko et al. | |
| 2002/0099950 A1 | 7/2002 | Smith | |
| 2002/0136118 A1 | 9/2002 | Takahashi | |
| 2002/0136134 A1 | 9/2002 | Ito et al. | |
| 2002/0136537 A1 | 9/2002 | Takahashi | |
| 2002/0159382 A1 | 10/2002 | Ohata et al. | |
| 2002/0161774 A1 | 10/2002 | Tol et al. | |
| 2002/0176341 A1 | 11/2002 | Ko et al. | |
| 2003/0072236 A1 | 4/2003 | Hirotsune et al. | |
| 2003/0095482 A1 | 5/2003 | Hung et al. | |
| 2003/0126527 A1 | 7/2003 | Kim et al. | |
| 2003/0135800 A1 | 7/2003 | Kim et al. | |
| 2003/0137909 A1 | 7/2003 | Ito et al. | |
| 2003/0137910 A1 | 7/2003 | Ueda et al. | |
| 2003/0142608 A1 | 7/2003 | Yamamoto et al. | |
| 2003/0149918 A1 | 8/2003 | Takaichi | |
| 2003/0173669 A1 | 9/2003 | Shau | |
| 2003/0198155 A1 | 10/2003 | Go et al. | |
| 2004/0001408 A1 | 1/2004 | Propps et al. | |
| 2004/0004917 A1 | 1/2004 | Lee | |
| 2004/0062159 A1 | 4/2004 | Park et al. | |
| 2004/0062160 A1 | 4/2004 | Park et al. | |
| 2004/0076096 A1 | 4/2004 | Hwang et al. | |
| 2004/0105363 A1 | 6/2004 | Ko et al. | |
| 2004/0114474 A1 | 6/2004 | Park et al. | |
| 2004/0120233 A1 | 6/2004 | Park et al. | |
| 2004/0125716 A1 | 7/2004 | Ko et al. | |
| 2004/0125717 A1 | 7/2004 | Ko et al. | |
| 2004/0136292 A1 | 7/2004 | Park et al. | |
| 2004/0145980 A1 | 7/2004 | Park et al. | |
| 2004/0158768 A1 | 8/2004 | Park et al. | |
| 2004/0174782 A1 | 9/2004 | Lee et al. | |
| 2004/0174785 A1 | 9/2004 | Ueda et al. | |
| 2004/0179445 A1 | 9/2004 | Park et al. | |
| 2004/0179458 A1 | 9/2004 | Hwang et al. | |
| 2004/0193946 A1 | 9/2004 | Park et al. | |
| 2004/0223427 A1 | 11/2004 | Kim et al. | |
| 2004/0246851 A1 | 12/2004 | Hwang et al. | |
| 2004/0246852 A1 | 12/2004 | Hwang et al. | |
| 2005/0007910 A1 | 1/2005 | Ito et al. | |
| 2005/0008346 A1 | 1/2005 | Noguchi et al. | |
| 2005/0025007 A1 | 2/2005 | Park | |
| 2005/0047294 A1 | 3/2005 | Park | |
| 2005/0050402 A1 | 3/2005 | Koda et al. | |
| 2005/0052972 A1 | 3/2005 | Park | |
| 2005/0052973 A1 | 3/2005 | Park | |
| 2005/0055500 A1 | 3/2005 | Park | |
| 2005/0060489 A1 | 3/2005 | Park | |

| | | | |
|---|---|---|---|
| 2005/0068877 A1 | 3/2005 | Yeo | |
| 2005/0083740 A1 | 4/2005 | Kobayashi | |
| 2005/0083767 A1 | 4/2005 | Terada et al. | |
| 2005/0083830 A1 | 4/2005 | Martens et al. | |
| 2005/0195716 A1 | 9/2005 | Ko et al. | |
| 2005/0207262 A1 | 9/2005 | Terada et al. | |
| 2005/0289389 A1 | 12/2005 | Yamagami et al. | |
| 2006/0077827 A1 | 4/2006 | Takahashi | |
| 2006/0195719 A1 | 8/2006 | Ueda et al. | |
| 2006/0203635 A1 | 9/2006 | Ko et al. | |
| 2006/0203638 A1 | 9/2006 | Ko et al. | |
| 2006/0203684 A1 | 9/2006 | Ko et al. | |
| 2006/0227694 A1 | 10/2006 | Woerlee et al. | |
| 2007/0294571 A1 | 12/2007 | Park et al. | |
| 2008/0046780 A1 | 2/2008 | Shibuya et al. | |

FOREIGN PATENT DOCUMENTS

| | | |
|---|---|---|
| CN | 1140897 C | 1/1997 |
| CN | 1227950 A | 9/1999 |
| CN | 1273419 A | 11/2000 |
| CN | 1675708 A | 9/2005 |
| CN | 1685426 A | 10/2005 |
| DE | 199 54 054 A1 | 6/2000 |
| EP | 0314186 A2 | 5/1989 |
| EP | 0 325 823 A1 | 8/1989 |
| EP | 0350920 A2 | 1/1990 |
| EP | 0428208 | 5/1991 |
| EP | 0464811 A2 | 1/1992 |
| EP | 0 472 484 A2 | 2/1992 |
| EP | 0477503 A2 | 4/1992 |
| EP | 0556046 A1 | 8/1993 |
| EP | 0871172 A2 | 10/1998 |
| EP | 0908882 A2 | 4/1999 |
| EP | 0974967 A1 | 1/2000 |
| EP | 0989554 A1 | 3/2000 |
| EP | 0997904 A1 | 5/2000 |
| EP | 1026681 B1 | 8/2000 |
| EP | 1043723 A1 | 10/2000 |
| EP | 1132914 A2 | 9/2001 |
| EP | 1148493 A2 | 10/2001 |
| EP | 1152414 A2 | 11/2001 |
| EP | 1239478 A1 | 9/2002 |
| EP | 1274081 A2 | 1/2003 |
| EP | 1298659 A1 | 4/2003 |
| EP | 1329888 A1 | 7/2003 |
| EP | 1347452 A2 | 9/2003 |
| EP | 1547065-AO | 6/2005 |
| EP | 1564740 A1 | 8/2005 |
| EP | 1573723 A0 | 9/2005 |
| EP | 1612790 A1 | 1/2006 |
| EP | 1623422-AO | 2/2006 |
| GB | 2356735 A | 5/2001 |
| JP | 63-091842 A | 4/1988 |
| JP | 63-091842 A | 4/1988 |
| JP | 01-263955 A | 10/1989 |
| JP | 02-023417 A | 1/1990 |
| JP | 05-274814 A | 10/1993 |
| JP | 06-349201 A | 12/1994 |
| JP | 08-096522 A | 4/1996 |
| JP | 09-145634 A | 6/1997 |
| JP | 09-231053 A | 9/1997 |
| JP | 10-050005 A | 2/1998 |
| JP | 10-050032 A | 2/1998 |
| JP | 10-187356 | 7/1998 |
| JP | 10-187357 | 7/1998 |
| JP | 10-187358 | 7/1998 |
| JP | 10-187359 | 7/1998 |
| JP | 10-187360 | 7/1998 |
| JP | 10-187361 A1 | 7/1998 |
| JP | 11-110888 A | 4/1999 |
| JP | 11-203792 A | 7/1999 |
| JP | 2000-090588 A | 3/2000 |
| JP | 2000-149449 A | 5/2000 |
| JP | 2000-195178 A | 7/2000 |
| JP | 2000-215612 | 8/2000 |
| JP | 2000-285607 A | 10/2000 |
| JP | 2001-023317 A | 1/2001 |
| JP | 2001-069440 A | 3/2001 |
| JP | 2001-110168 A | 4/2001 |
| JP | 2001-351334 A | 12/2001 |
| JP | 2001-357623 A | 12/2001 |
| JP | 2002-015507 A | 1/2002 |
| JP | 2002-015525 A | 1/2002 |
| JP | 2002-056619 A | 2/2002 |
| JP | 2002-215612 A | 8/2002 |
| JP | 2002-245723 A | 8/2002 |
| JP | 2002-288938 A | 10/2002 |
| JP | 2002-329321 A | 11/2002 |
| JP | 2002-352522 A | 12/2002 |
| JP | 2003-536194 A | 12/2003 |
| JP | 2004-280864 A | 10/2004 |
| JP | 2004-280865 A | 10/2004 |
| JP | 2005-004912 A | 6/2005 |
| JP | 2005-535993 A | 11/2005 |
| JP | 2005-538490 A | 12/2005 |
| JP | 2005-538491 A | 12/2005 |
| JP | 2006-519445 A | 8/2006 |
| KR | 1020040094301 A | 11/2004 |
| RU | 2005 103 626 | 9/2005 |
| RU | 2005 127 337 | 2/2006 |
| TW | 371752 | 10/1999 |
| TW | 413805 | 12/2000 |
| WO | WO-84/00628 A1 | 2/1984 |
| WO | WO-96/30902 A1 | 10/1996 |
| WO | WO-97/22182 A1 | 6/1997 |
| WO | WO-00/54274 A1 | 9/2000 |
| WO | WO-01/22416 A1 | 3/2001 |
| WO | WO-01/93035 A2 | 12/2001 |
| WO | WO-03/007296 A1 | 1/2003 |
| WO | WO-03/025924 A1 | 3/2003 |
| WO | WO-03/079353 A1 | 9/2003 |
| WO | WO-2004/015707 A1 | 2/2004 |
| WO | WO-2004/015708 A1 | 2/2004 |
| WO | WO-2004/025648 | 3/2004 |
| WO | WO-2004/025649 | 3/2004 |
| WO | WO-2004/029668 A2 | 4/2004 |
| WO | WO-2004/029941 A1 | 4/2004 |
| WO | WO-2004-029968 | 4/2004 |
| WO | WO-2004/034396 A1 | 4/2004 |
| WO | WO-2004/036561 A1 | 4/2004 |
| WO | WO-2004/053872 A1 | 6/2004 |
| WO | WO-2004/053874 A1 | 6/2004 |
| WO | WO-2004/068476 A1 | 8/2004 |
| WO | WO-2004/015180 A1 | 9/2004 |
| WO | WO-2004/075180 | 9/2004 |
| WO | WO-2004/079631 | 9/2004 |
| WO | WO-2004/079731 A1 | 9/2004 |
| WO | WO-2004/079740 A1 | 9/2004 |
| WO | WO-2004/081926 A1 | 9/2004 |
| WO | WO-2004/086379 | 10/2004 |
| WO | WO-2004/093035 A1 | 10/2004 |
| WO | WO-2004/100155 A1 | 11/2004 |
| WO | WO-2004/100156 A1 | 11/2004 |
| WO | WO-2005/004123 A1 | 1/2005 |
| WO | WO-2005/004154 A2 | 1/2005 |

OTHER PUBLICATIONS

Yokozeki et al., "A Virtual Optical Disk Method to Realize Rewritability and Revision Control on a Write-Once Optical Disk" Faculty of Technology, Tokyo University of Agriculture and Technology, Koganei, Japan, pp. 34-43, 1990.

* cited by examiner

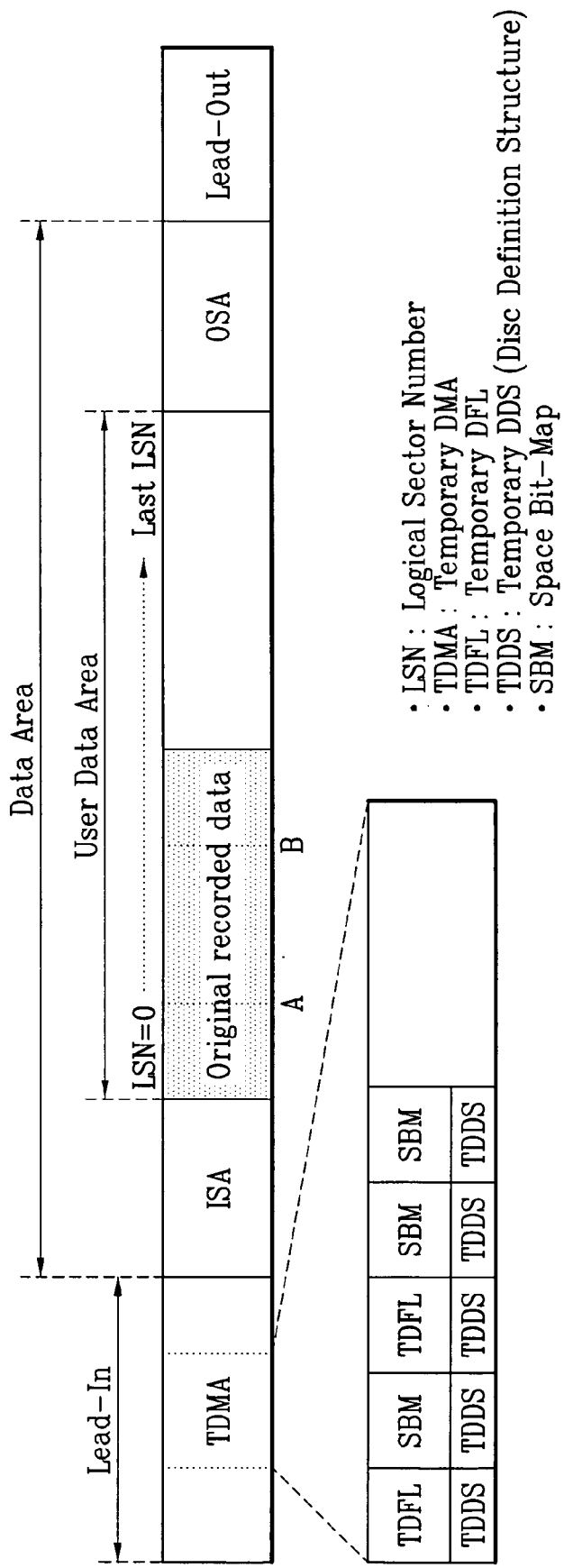

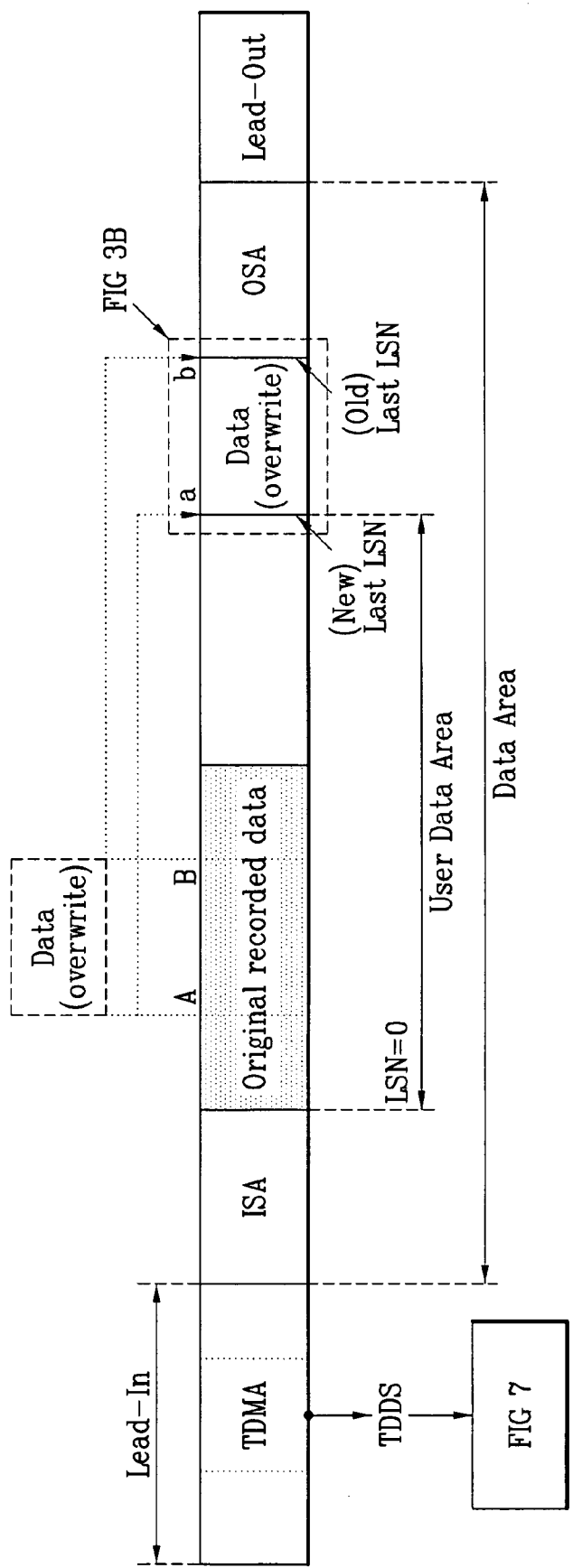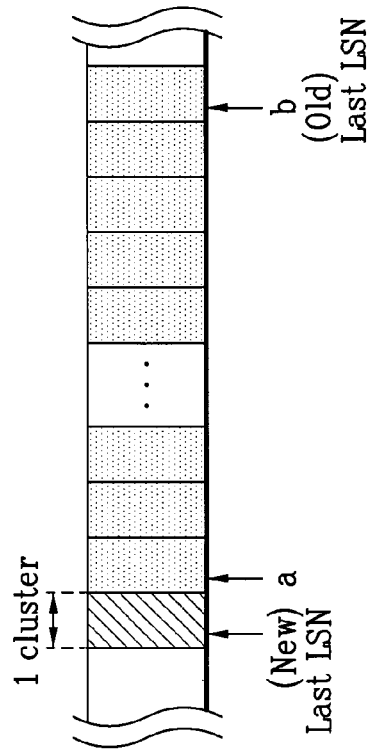

FIG. 7

TDDS

| TDDS identifier = "TDS" |
|---|
| TDDS update counter |
| ⋮ |
| Location LSN=0 of User Data Area |
| Location (new) Last LSN of User Data Area |
| ⋮ |

FIG. 8

TDDS

| TDDS identifier = "TDS" |
|---|
| TDDS update counter |
| ⋮ |
| Location LSN=0 of User Data Area |
| Location Last LSN of User Data Area |
| Location Last LSN of usable User Data Area |
| ⋮ |

FIG. 14

TDDS

| TDDS identifier = "TDS" |
|---|
| TDDS update counter |
| ⋮ |
| Location LSN=0 of User Data Area |
| Location (new) Last LSN of User Data Area of Layer 0 |
| Location (new) Last LSN of User Data Area of Layer 1 |
| ⋮ |

FIG. 15

TDDS

| TDDS identifier = "TDS" |
|---|
| TDDS update counter |
| ⋮ |
| Location LSN=0 of User Data Area |
| Location Last LSN of User Data Area of Layer 0 |
| Location Last LSN of User Data Area of Layer 1 |
| Location Last LSN of usable User Data Area of Layer 0 |
| Location Last LSN of usable User Data Area of Layer 1 |
| ⋮ |

METHOD AND APPARATUS FOR MANAGING OVERWRITE ON AN OPTICAL DISC WRITE ONCE

This application claims the benefit of the Korean Application No. P2002-78889 filed on Dec. 11, 2002 and P2003-5212 filed on Jan. 27, 2003 and P2003-9896 filed on Feb. 17, 2003 and P2003-13199 filed on Mar. 3, 2003 and P2003-45316 filed on Jul. 4, 2003 which are hereby incorporated by reference.

BACKGROUND OF THE INVENTION

1. Field of the Invention

The present invention relates to a method and apparatus for managing overwrite on an optical disc write once.

2. Discussion of the Related Art

Recently, it is expected that a new HD-DVD (High-Density Digital Versatile Disc) on which video data and audio data can be written and stored in high qualities and in large quantities, for example, a BD-RE (Blu-ray Rewritable Disc), will be developed and produced.

The BD-RE, as shown in FIG. 1, is divided into an LIA (Lead-In Area), a data area, and an LOA (Lead-Out Area). In the head and the tail of the data area, an ISA (Inner Spare Area) and an OSA (Outer Spare Area) are dividedly arranged.

On the BD-RE, data is recorded in the unit of a cluster corresponding to a specified recording unit, and it is possible to repeatedly record the data in a specified area of the BD-RE, which is called a physical overwrite. At this time, as shown in FIG. 1, it is detected if any defect area exists in the data area during recording the data. If the defect area is detected, a series of replacement-recording operations for performing a replacement recording of the data recorded in the defect area, for example, in the ISA, is performed. Also, position information on the defect area and position information replacement-recorded in the spare area are recorded and stored as a defect list in a DMA (Defect Management Area) of the read-in area as management information.

Meanwhile, the standardization of a BD-WO (Blu-ray Disc Write Once) has recently been discussed among companies concerned, and since the BD-WO is recordable only once over the whole area of the disc, it is impossible to perform the physical overwrite on the BD-WO unlike the BD-RE.

However, it may be necessary to perform the overwrite on a BD-WO in order to edit the recorded data, to modify a part of the recorded data, or to offer convenience to a user or a host, and thus an efficient scheme for this is urgently demanded.

SUMMARY OF THE INVENTION

Accordingly, the present invention is directed to a method and apparatus for managing overwrite on an optical disc write once that substantially obviate one or more problems due to limitations and disadvantages of the related art.

An object of the present invention is to provide a method and apparatus for managing overwrite on an optical disc write once which make it possible to perform a physical overwrite on the disc and maintain the continuity of a user data area after performing the physical overwrite.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of managing overwrite on an optical disc write once, includes replacement-recording data, which is requested to be overwritten in a specified area of the disc where recording is completed, from a rear of a user data area of the disc, and recording information on a last recordable position of the user data area, which is changed in accordance with the replacement recording operation, in a management area of the disc.

In another aspect of the present invention, a method of managing overwrite on an optical disc write once, includes replacement-recording data, which is requested to be overwritten in a specified area of the disc where recording is completed, from an area preceding an outer spare area (OSA) of the disc, extending the OSA as large as a size of a replacement-recorded area, and recording information on a last recordable position of the user data area, which is changed in accordance with the extension of the OSA, in a management area of the disc.

In still another aspect of the present invention, a method of managing overwrite on an optical disc write once, includes replacement-recording data, which is requested to be overwritten in a specified area of the disc where recording is completed, in an outer spare area (OSA) of the disc, determining whether to extend the OSA in consideration of a size of a replacement-recorded area, and recording information on a last recordable position of the user data area, which is changed in accordance with the determination of the extension of the OSA, in a management area of the disc.

In still another aspect of the present invention, a method of managing overwrite on an optical disc write once having a plurality of recording layers, includes selectively replacement-recording data, which is requested to be overwritten in a specified area of the disc where recording is completed, in a user data area of the respective recording layer of the disc, and recording information on a last recordable position of the user data area of the respective recording layer, which is changed in accordance with the replacement recording operation, in a management area of the disc.

In still another aspect of the present invention, a method of managing overwrite on an optical disc write once, includes receiving a recording command for requesting recording on a specified area of the disc, judging whether the specified area is an already recorded area or a non-recorded area, and if it is judged that the specified area is the already recorded area, replacement-recording data in another area of a user data area so that a continuity of the user data area can be secured even after the replacement-recoding operation.

In still another aspect of the present invention, an apparatus for recording/reproducing an optical disc write once, includes a controller for transferring a recording command for requesting recording on a specified area of the disc, and a recording device for judging whether the specified area is an already recorded area or a non-recorded area, and if it is judged that the specified area is the already recorded area, replacement-recording data in another area of a user data area so that a continuity of the user data area can be secured even after the replacement-recoding operation.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 illustrates the construction of a BD-WO as an optical disc write once according to the present invention;

FIGS. 3A and 3B illustrate a method of managing overwrite on an optical disc write once according to another embodiment of the present invention;

FIGS. 7 and 8 illustrate management information associated with the method of managing overwrite on an optical disc write once according to the present invention;

FIGS. 14 and 15 illustrate management information associated with the method of managing overwrite on a dual-layer type optical disc write once according to the present invention.

DETAILED DESCRIPTION OF THE INVENTION

Figure 1:
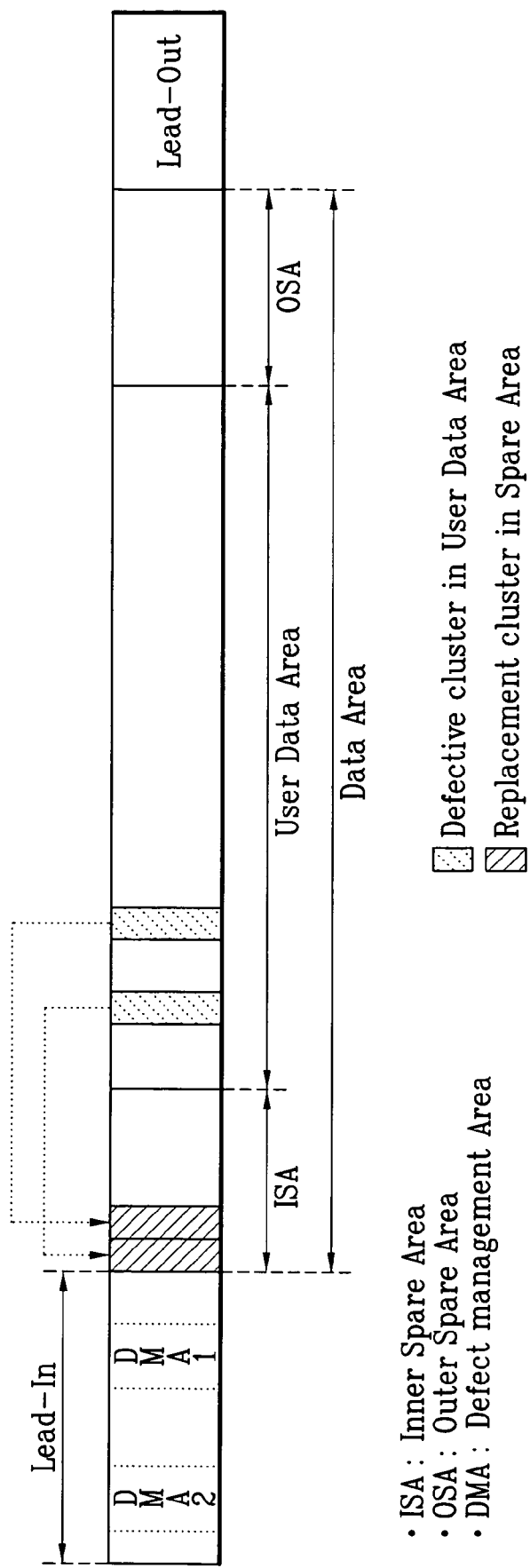
FIG. 1 schematically illustrates the construction of a BD-RE as a rewritable optical disc according to the related art.

Reference will now be made in detail to the method of managing overwrite on an optical disc write once according to the preferred embodiments of the present invention, examples of which are illustrated in the accompanying drawings. In addition, general terms widely used are selected in describing the present invention. In specified cases, however, terms selected at the applicant's discretion are also used, but their meanings are described in detail in the corresponding parts of the description. Thus, it should be understood that the present invention should be grasp with the meanings of the terms, not the terms themselves.

The present invention makes it possible to perform overwrite even on an optical disc write once. Generally, the term "overwrite" means a repeated recording in a specified area of a rewritable optical disc. In other words, the term 'overwrite' is just the inherent characteristic of the rewritable optical disc, and thus, it is known that it is impossible to perform the overwrite on the optical disc write once.

However, the present invention makes it possible to perform a logical overwrite as it maintains the physical characteristic of the optical disc write once, i.e., the characteristic of write once, is maintained. Especially, by maintaining the continuity of the user data area after the physical overwrite operation, it heightens the use efficiency of the disc. Now, diverse embodiments of the present invention will be explained, taking a BD-WO as an example.

FIG. 2 illustrates the construction of a BD-WO as an optical disc write once according to the present invention. The BD-WO (Blu-ray Disc Write Once) includes an LIA (Lead-In Area), a data area, and an LOA (Lead-Out Area). In the head and the tail of the data area, an ISA (Inner Spare Area) and an OSA (Outer Spare Area) may be dividedly arranged, and a user data area, in which data is actually recorded, is positioned between the ISA and the OSA. An LSN (Logical Sector Number) is given to the user data area, and a user or a host transfers a recording command with reference to the LSN. A recording device converts the LSN into a PSN (Physical Sector Number), which actually indicates position information in the disc, to perform the recording command.

Also, in the disc, a TDMA (Temporary Defect Management Area) is provided. A TDFL (Temporary Defect List), TDDS (Temporary Disc Definition Structure), SBM (Space Bit-Map) are recorded in the TDMA as management information. According to the present invention, in recording the management information after performing the replacement recording, position information on the original area and the replacement-recorded area is recorded in the TDFL, and the LSN, which indicates the continuity of the user data area after the replacement recording, is recorded in the TDDS.

Also, the SBM information recorded in the TDMA represents '1b' if the corresponding cluster is an recorded area and '0b' if the cluster is a non-recorded area and vice versa, by allocating one bit for each cluster which is the minimum recording unit. Accordingly, it can be easily known where recorded areas and non-recorded areas exist in the disc by reading the SBM information. The recording/reproducing device can judge the recorded/non-recorded state of the corresponding area through the SBM information after it receives the user's recording command for recording the specified area, and if the specified area is the already recorded area, it performs the replacement recording of the data in another area of the data area to make the logical overwrite possible.

The management information such as TDFL, TDDS, SBM, etc., recoded in the TDMA is updated in the minimum unit of a cluster for a specified update timing, and in the optical disc write one, the area in which the management information such as TDMA is recorded is absolutely necessary.

In FIG. 2, if an already recorded area exists in the data area, it is not physically permitted to overwrite on the corresponding area due to the characteristic of the optical disc write once. However, if a recording command of a user or a host requests performing of the recording on an A-B area (e.g., already recorded area) as shown in FIG. 2, the present invention makes a recording/reproducing device itself perform the replacement recording of data in another area in the data area. Accordingly, the user or the host can command the recording irrespective of whether the specified area of the disc is recorded or not, and thus the user can use the optical disc write once just like the rewritable optical disc. This is called a logical overwrite (LOW) in distinction from the physical overwrite.

Also, in carrying out the recording command on the A-B area as shown in FIG. 2, overwrite cannot be performed on the corresponding area since it is already recorded area. However, the recording command can be carried out in a manner that the data is replacement-recorded in the data area, and especially in a position of the data area where the continuity of the user data area is secured, and the corresponding management area is recorded in the TDMA of the disc to complete the performing of the recording command.

FIG. 3A shows a method of managing overwrite on an optical disc write once according to the present invention. In replacement-recording the data of the area (e.g., A-B area) where the overwrite is requested in another area of the data area, in order to maintain the continuity of the user data area after the replacement recording, the data is replacement-recorded from the front of the OSA, and after the replacement recording, the last recordable position of the user data area is changed. That is, before the replacement recording, the user data area has the last LSN information corresponding to the just front position of the OSA, but after the replacement recording, a new last LSN is given to the user data area. By doing this, the user or host commands the recording based on the LSN, and thus the already recorded area is excluded from the LSN. As a result, the continuity of the user data area is generally maintained, and this provides a convenient operation of the recording/reproducing device (the numeral '10' in FIG. 16) in performing the recording of the disc.

FIG. 3B is a partially enlarged view of the replacement-recorded area (e.g., a-b area). The replacement recording is performed from the old last LSN position, and after the completion of the replacement recording, the last LSN of the recordable user data area is given to the just front of the 'a' position, so that the next overwrite will be performed from the new last LSN.

The information according to the change of the last LSN after the replacement recording as described above should be recorded anywhere in the management area of the disc, and in the present invention, for example, the information is recorded in the TDDS of the TDMA. The TDDS includes a lot of general disc management information, and since the latest information is recorded in the TDDS for each update timing, the TDDS would be most suitable for recording the management information.

Figure 4:
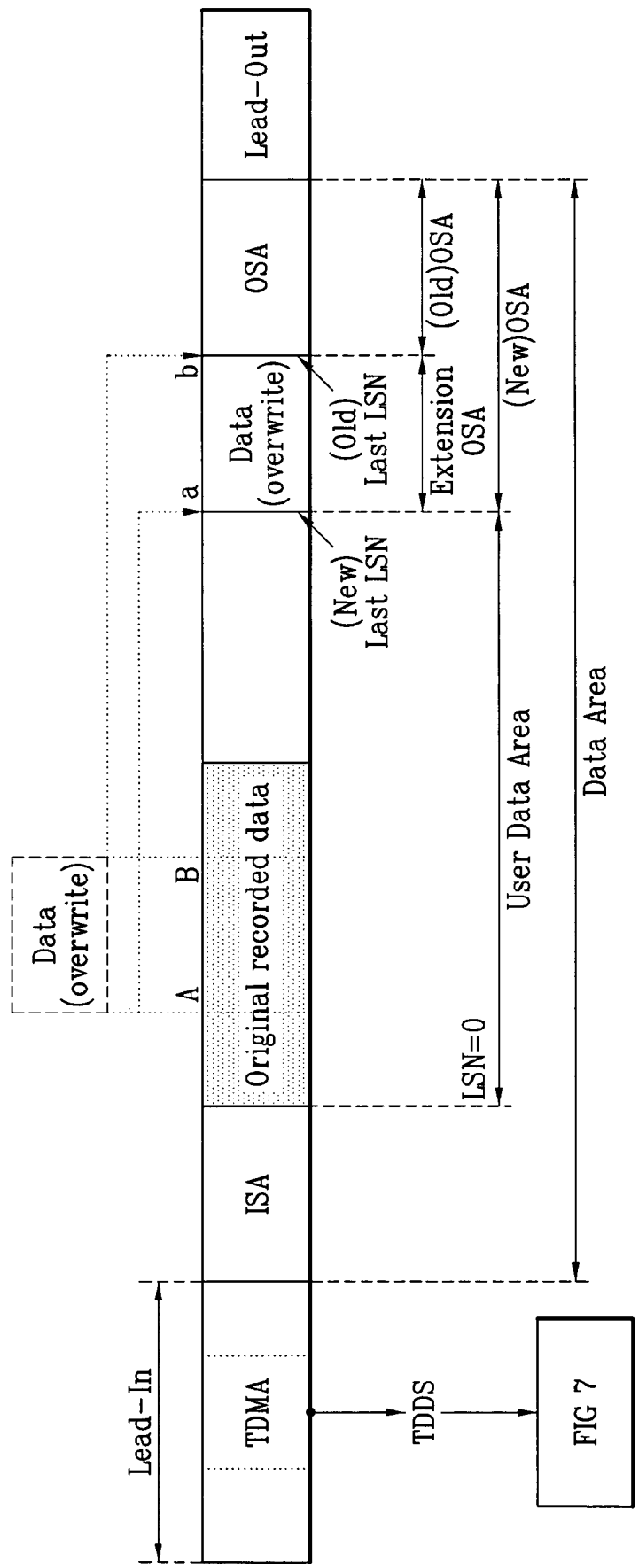
FIGS. 4 and 5 illustrate methods of managing overwrite on an optical disc write once according to other embodiments of the present invention.

FIG. 4 illustrates a method of managing overwrite on an optical disc write once according to another embodiment of the present invention. In replacement-recording the data of the area (e.g., A-B area) which is requested to be overwritten in another area of the data area, in order maintain the continuity of the user data area after the replacement recording, the replacement recording is performed from an area preceding the OSA, i.e., in the a-b area, the OSA is extended as large as a size of the replacement-recorded area, and then information on the last recordable position of the user data area, which is changed in accordance with the extended OSA, is recorded as the management information.

Figure 5:
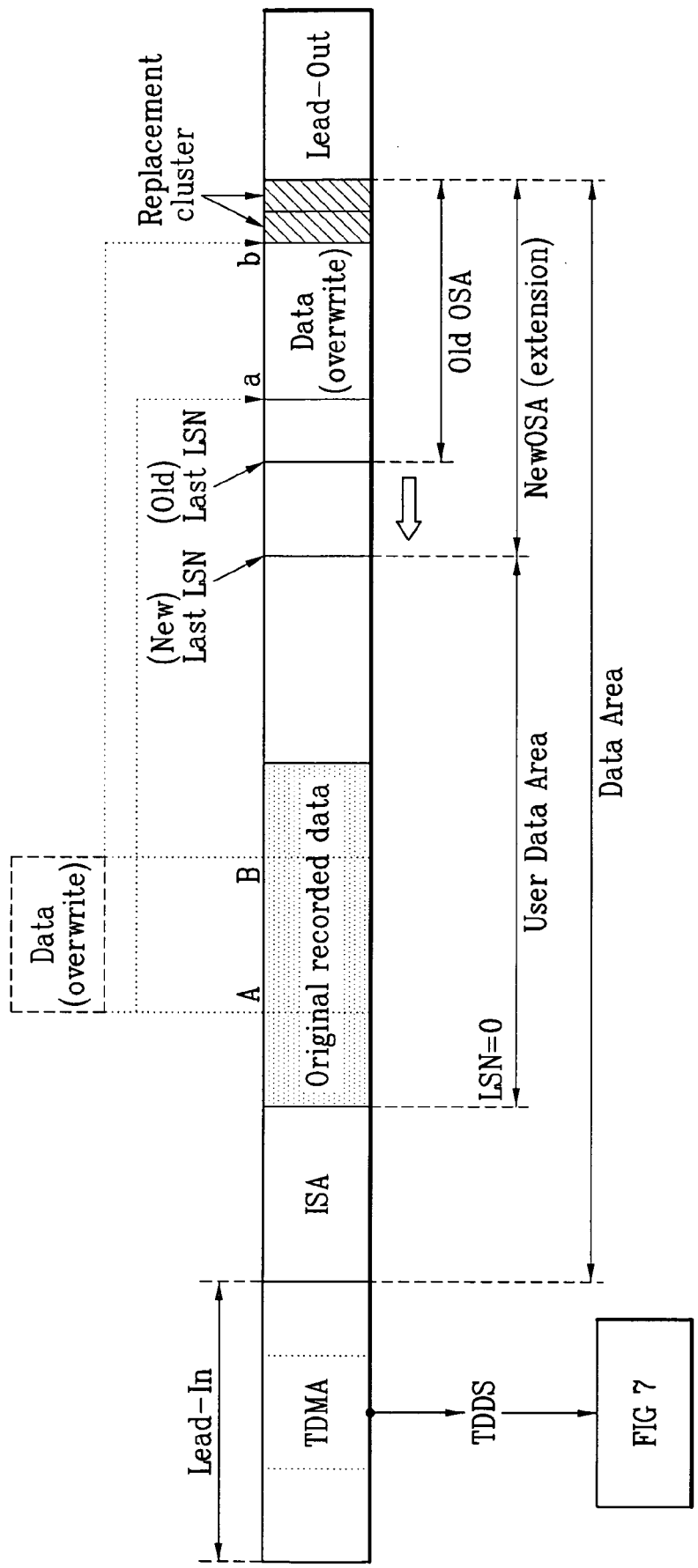

FIG. 5 illustrates a method of managing overwrite on an optical disc write once according to still another embodiment of the present invention. In replacement-recording the data of the area (e.g., A-B area) which is requested to be overwritten in another area of the data area, in order maintain the continuity of the user data area after the replacement recording, the replacement recording is performed in the OSA, the OSA is made to be extendable in consideration of the size of the replacement-recorded area after the replacement recording operation, and if the OSA is extended, information on the last recordable position of the user data area, which is changed in accordance with the extended OSA, is recorded as the management information. Accordingly, the OSA may not be extended I consideration of the size of the replacement-recorded area after the replacement recording operation, and if the OSA is not extended, the last recordable position information of the user data area will not be changed. Also, it is possible to extend the OSA before the replacement recording operation, and the extension of the OSA may be performed during the system initialization or during the use of the disc in accordance with the user's request.

FIG. 7 schematically illustrates the structure of the TDDS in which the LSN information, which is changed through the replacement recording performed by the overwrite request, is recorded according to the embodiments of the present invention of FIGS. 3, 4 and 5.

In the TDDS, a field for recording the position information of 'LSN=0' and the position information of 'Last LSN' is provided, and whenever the TDDS is updated, the position information of 'LSN=0' and the position information of 'Last LSN' are recorded. Accordingly, in the embodiments of the present invention of FIGS. 3, 4 and 5, the replacement recording is performed according to the overwrite request, and the last LSN information, which is changed through the replacement recording, is recorded.

Figure 6:
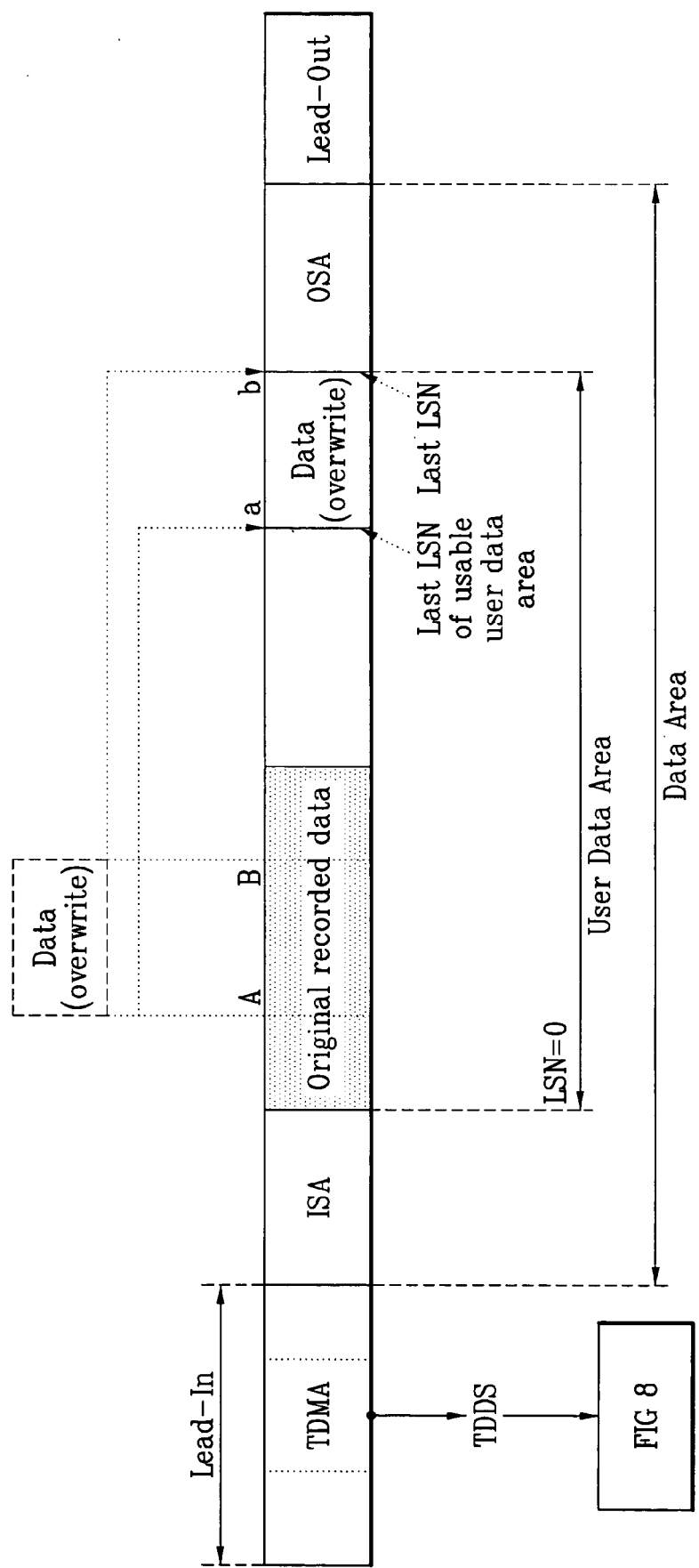
FIG. 6 illustrates a method of managing overwrite on an optical disc write once according to still another embodiment of the present invention.

FIG. 6 illustrates a method of managing overwrite on an optical disc write once according to still another embodiment of the present invention. In replacement-recording the data of the area (e.g., A-B area) which is requested to be overwritten in another area of the data area, in order maintain the continuity of the user data area after the replacement recording, the replacement recording is performed from an area preceding the OSA, i.e., in the a-b area, the OSA is extended as large as a size of the replacement-recorded area, and then the last recordable position of the user data area is changed after the replacement recording. In distinction from the embodiments of FIGS. 3, 4 and 5, according to the embodiment of FIG. 6, the last LSN value (before the OSA) given to the user data area before the replacement recording is maintained as it is, and a new last LSN is given to the user data area after the replacement recording. This is especially called the usable last LSN of the user data area.

FIG. 8 illustrates the management information recorded in the TDDS when the method of FIG. 6 is performed. The TDDS includes both the old last LSN value and the usable last LSN information changed after the replacement recording.

FIGS. 9 to 15 illustrate methods of managing overwrite on a dual-layer type optical disc write once according to embodiments of the present invention. Now, the embodiments of the present invention will be explained, taking a BD-WO as an example of the optical disc write once.

Figure 9:
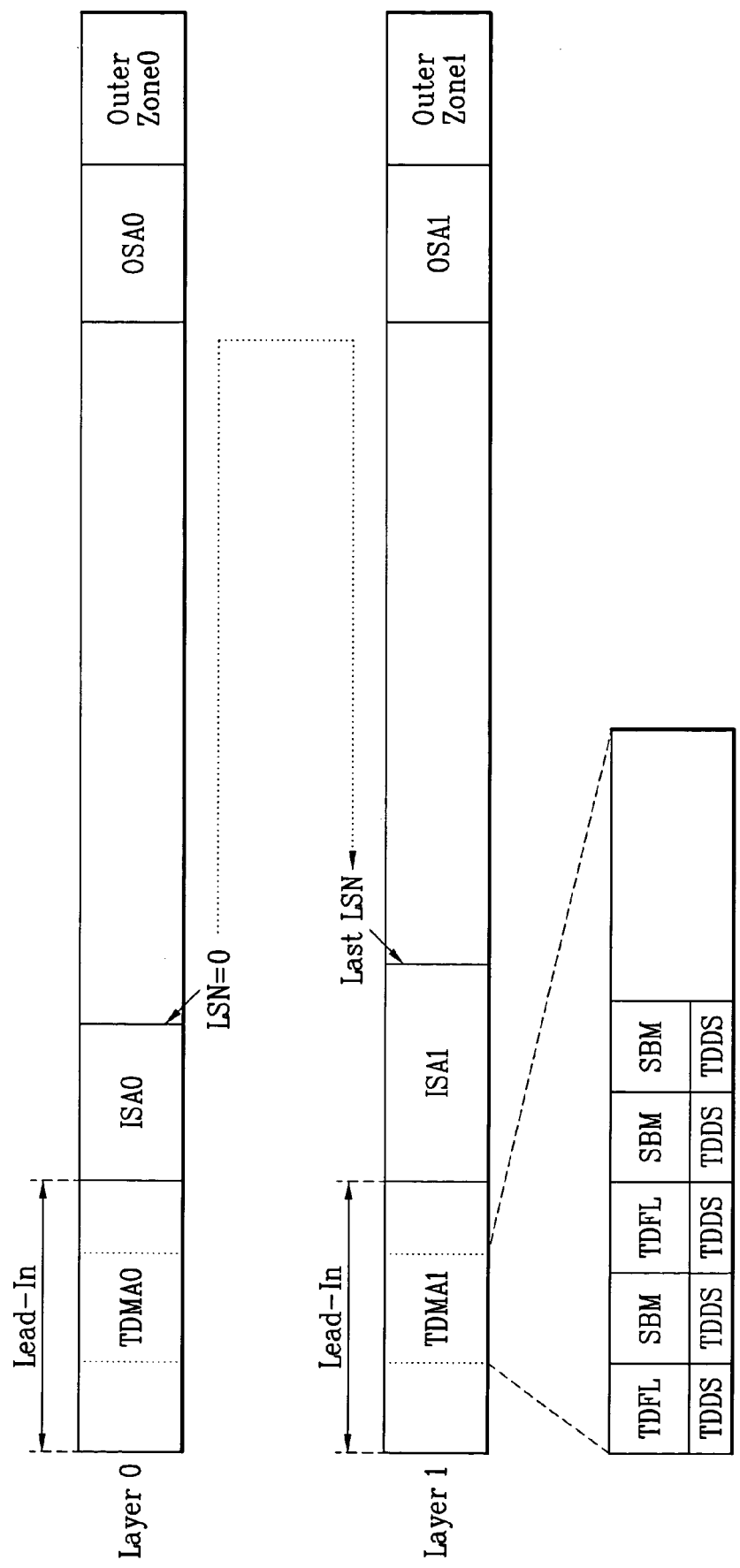
FIG. 9 illustrates the construction of a BD-WO as a dual-layer type optical disc write once according to the present invention.

First, FIG. 9 illustrates the construction of a BD-WO as a dual-layer type optical disc write once according to the present invention. In comparison to the single-layer type optical disc write once as illustrated in FIG. 2, the BD-WO of FIG. 9 shows the dual-layer type optical disc write once, and the two recording layers are called Layer0 and Layer1.

According to the dual-layer type BD-WO, the LSNs given to the user data area are consecutive values given from the end of ISA0 of Layer0 till the front of ISA1 of Layer1 (i.e., Last LSN). To the LIA and the LOA, TDMA0 and TDMA1 for recording the management information are respectively allocated, and TDFL, TDDS and SBM information are recorded in TDAM0 and TDMA1 in the same manner as the single-layer type BD-WO.

Figure 10:
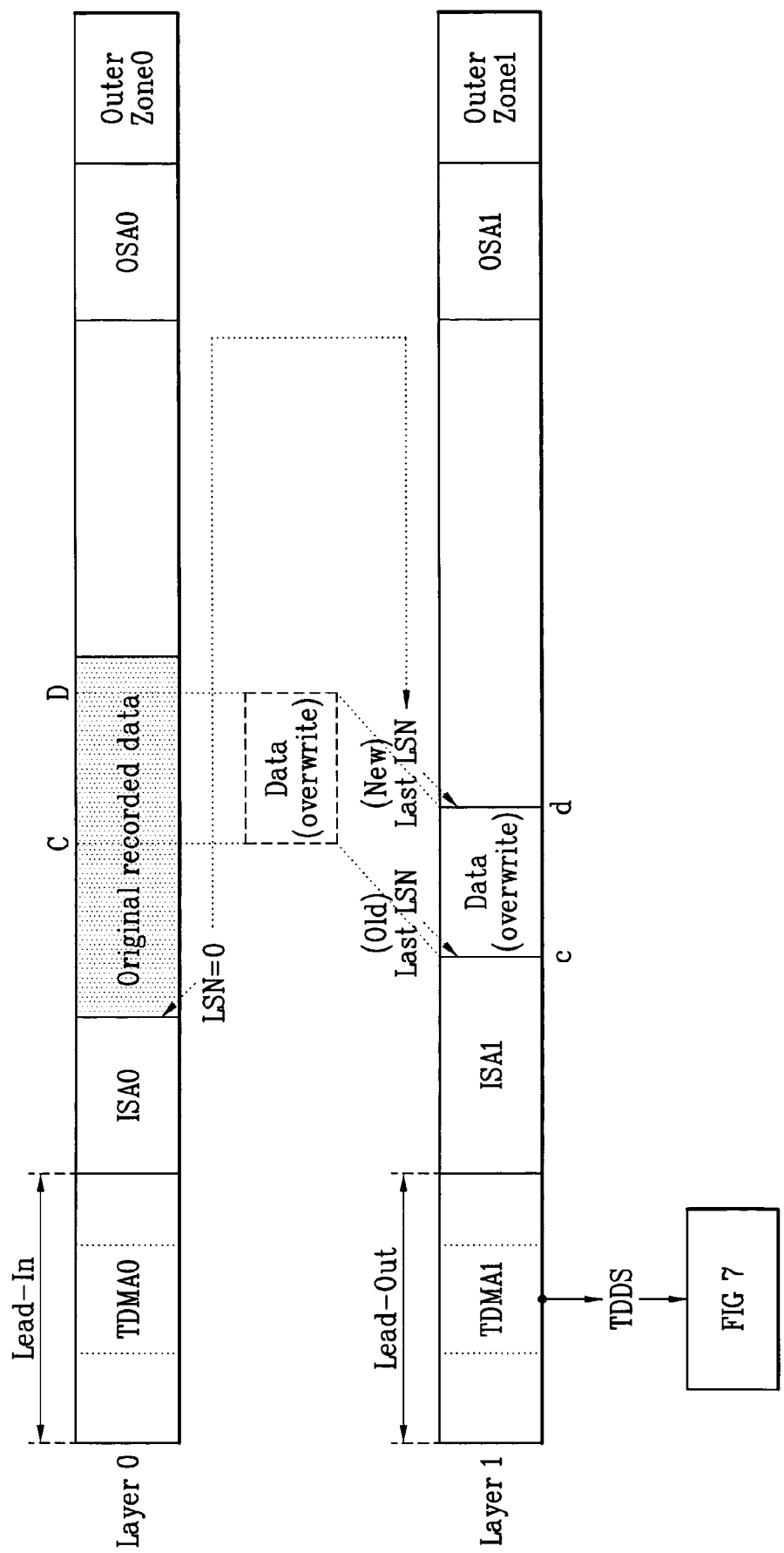
FIG. 10 illustrates a method of managing overwrite on a dual-layer type optical disc write once according to an embodiment of the present invention.

FIG. 10 illustrates a method of managing overwrite on a dual-layer type optical disc write once according to an embodiment of the present invention, which corresponds to the method of managing overwrite on a single-layer type optical disc write once of FIG. 3. In replacement-recording the data of the area (e.g., C-D area) where the overwrite is requested in another area of the data area, in order to maintain the continuity of the user data area after the replacement recording, the data is replacement-recorded from the front of the ISA1 (e.g., c-d area), and after the replacement recording, the last recordable position of the user data area is changed. In this case, the overwrite operation is performed in the same manner as the single-layer type optical disc write once. That is, before the replacement recording, the user data area has the last LSN information corresponding to the just front position of the ISA1, but after the replacement recording, a new last LSN is given to the user data area. The management information is recorded in the TDDS of the TDMA, and as shown in FIG. 7, the new last LSN information value is recorded during the TDDS update timing.

In the case of the dual-layer type disc, the replacement-recording of data in the front of the OSA or in the OSA of the single layer type disc as shown in FIGS. 4 and 5 can also be applied in the same manner, and in this case, ISA1 of Layer1 will be the extended spare area.

Figure 11:
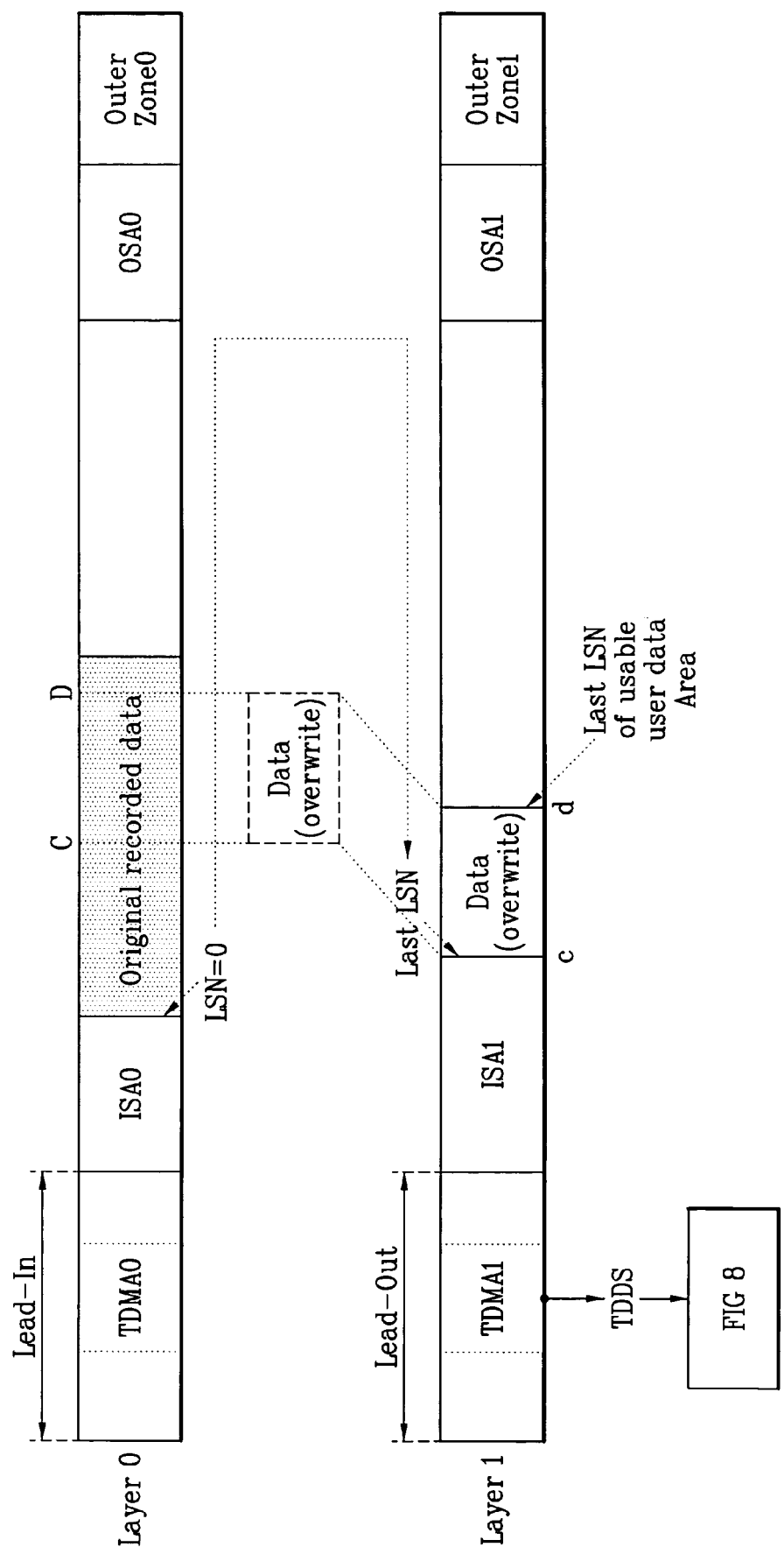
FIG. 11 illustrates a method of managing overwrite on a dual-layer type optical disc write once according to another embodiment of the present invention.

FIG. 11 illustrates a method of managing overwrite on a dual-layer type optical disc write once according to another embodiment of the present invention, which corresponds to the method of managing overwrite on a single-layer type optical disc write once of FIG. 6. In replacement-recording the data of the area (e.g., C-D area) where the overwrite is requested in another area of the data area, in order to maintain the continuity of the user data area after the replacement recording, the data is replacement-recorded from the front of the ISA1 (e.g., c-d area), and after the replacement recording, the last recordable position of the user data area is changed. That is, the last LSN information (before the ISA1) given to the user data area before the replacement recording is maintained as it is, and a new last LSN is given to the user data area after the replacement recording. This is especially called the usable last LSN of the user data area. The management information is recorded in the TDDS of the TDMA, and as shown in FIG. 8, the new usable last LSN information value is recorded during the TDDS update timing.

Figure 12:
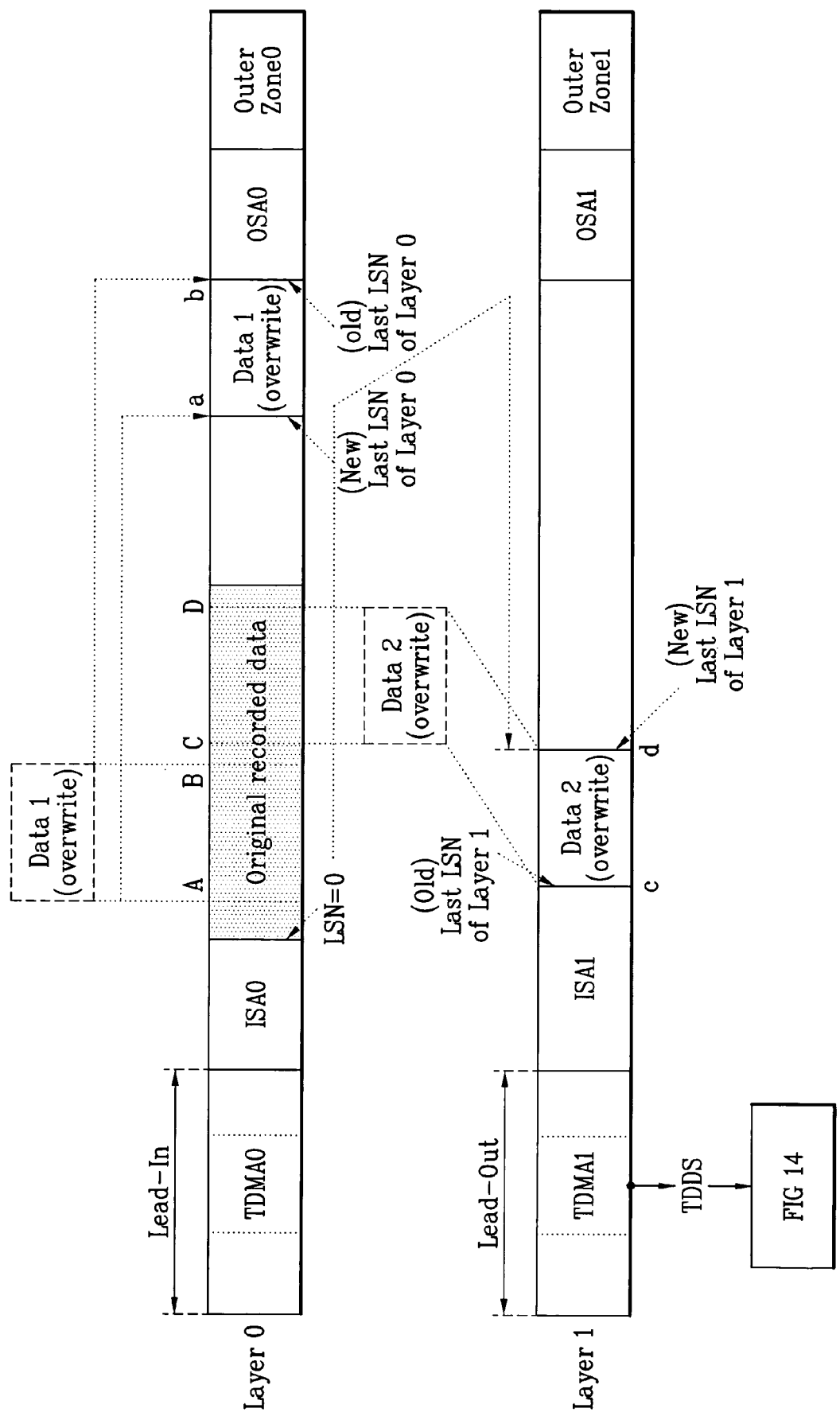
FIGS. 12 and 13 illustrate methods of managing overwrite on a dual-layer type optical disc write once according to still other embodiments of the present invention.

FIG. 12 illustrates a method of managing overwrite on a dual-layer type optical disc write once according to still another embodiment of the present invention, which has the last LSN information with respect to the respective recording layer. In replacement-recording the data of the areas (e.g., A-B area and C-D area) where the overwrite is requested in other areas of the data area, in order to maintain the continuity of the user data area after the replacement recording, the data of the A-B area is replacement-recorded in the front of the OSA0 (e.g., a-b area), and the data of the C-D area is replacement-recorded in the front of the ISA1 (e.g., c-d area). Also, after the replacement recording, the last recordable position of the user data area is changed with respect to the respective recording layer. In this case, the replacement recording is possible for the respective recording layers of the dual-layer type disc. That is, before the replacement recording, the last LSN information is given to the user data area of the respective recording layer (e.g., Last LSNs of Layer0 and Layer1), but after the replacement recording, a new last LSN is given to the user data area of the respective recording layer. The management information is recorded in the TDDS of the TDMA, and as shown in FIG. 14, the new last LSN information is recorded for the respective recording layer during the TDDS update timing.

In the case of the dual-layer type disc, the replacement-recording of data in the front of the OSA or in the OSA of the single layer type disc as shown in FIGS. 4 and 5 can also be applied in the same manner, and in this case, OSA0 will be the extended spare area of Layer0, and ISA1 will be the extended spare area of Layer1.

Figure 13:
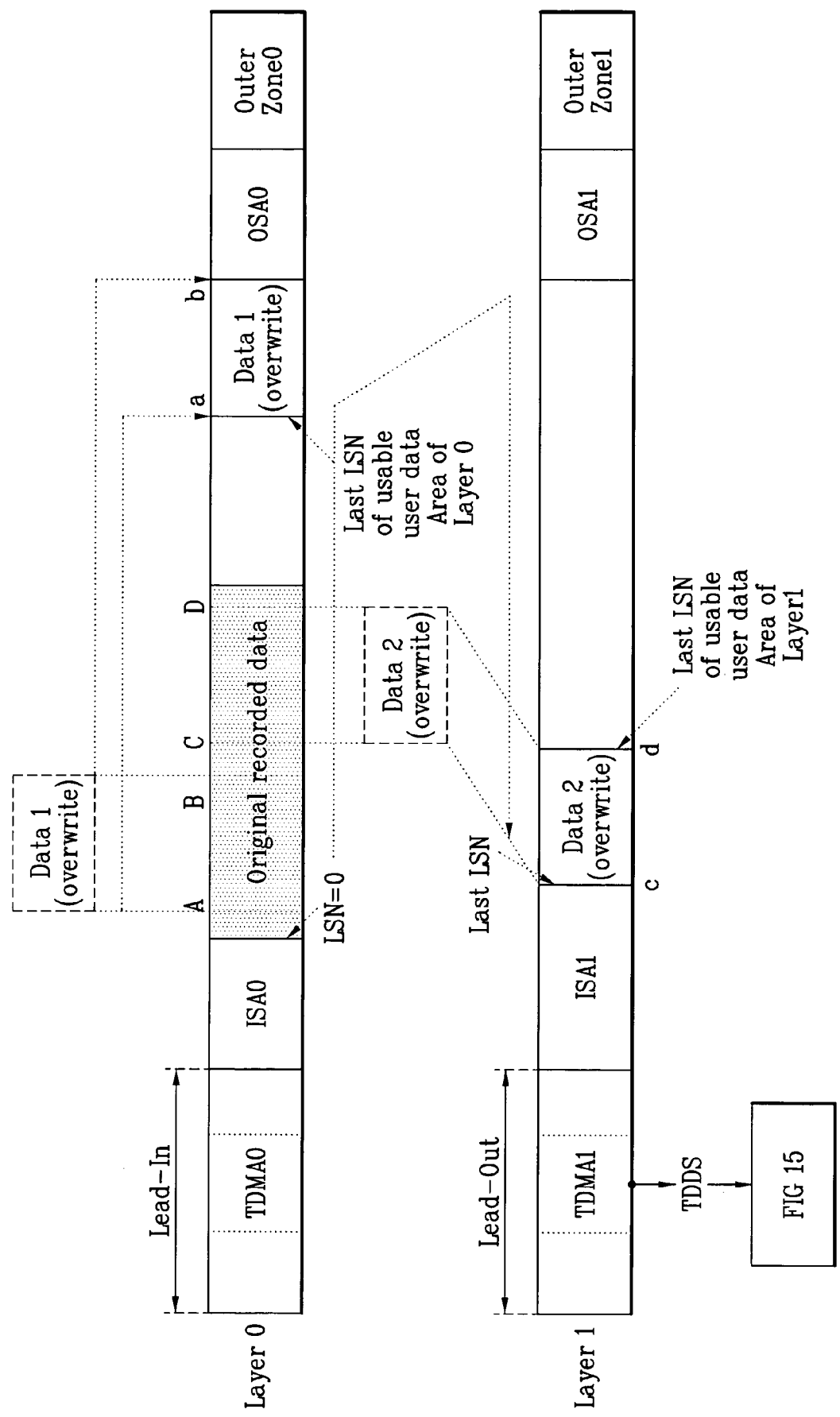

FIG. 13 illustrates a method of managing overwrite on a dual-layer type optical disc write once according to still another embodiment of the present invention. In replacement-recording the data of the areas (e.g., A-B area and C-D area) where the overwrite is requested in other areas of the data area, in order to maintain the continuity of the user data area after the replacement recording, the data of the A-B area is replacement-recorded in the front of the OSA0 (e.g., a-b area), and the data of the C-D area is replacement-recorded in the front of the ISA1 (e.g., c-d area). Also, after the replacement recording, the last recordable position of the user data area is changed with respect to the respective recording layer. In this case, the replacement recording is possible for the respective recording layers of the dual-layer type disc. That is, the last LSN information (e.g., Last LSNs of Layer0 and Layer1) given to the user data areas of the respective recording layers are maintained as they are, but after the replacement recording, new last LSNs are given to the user data areas of the respective recording layers. They are especially called the usable last LSNs of the usable user data areas of Layer0 and layer1). The management information is recorded in the TDDS of the TDMA, and as shown in FIG. 15, the new last LSN information values are recorded for the respective recording layers during the TDDS update timing.

Figure 16:
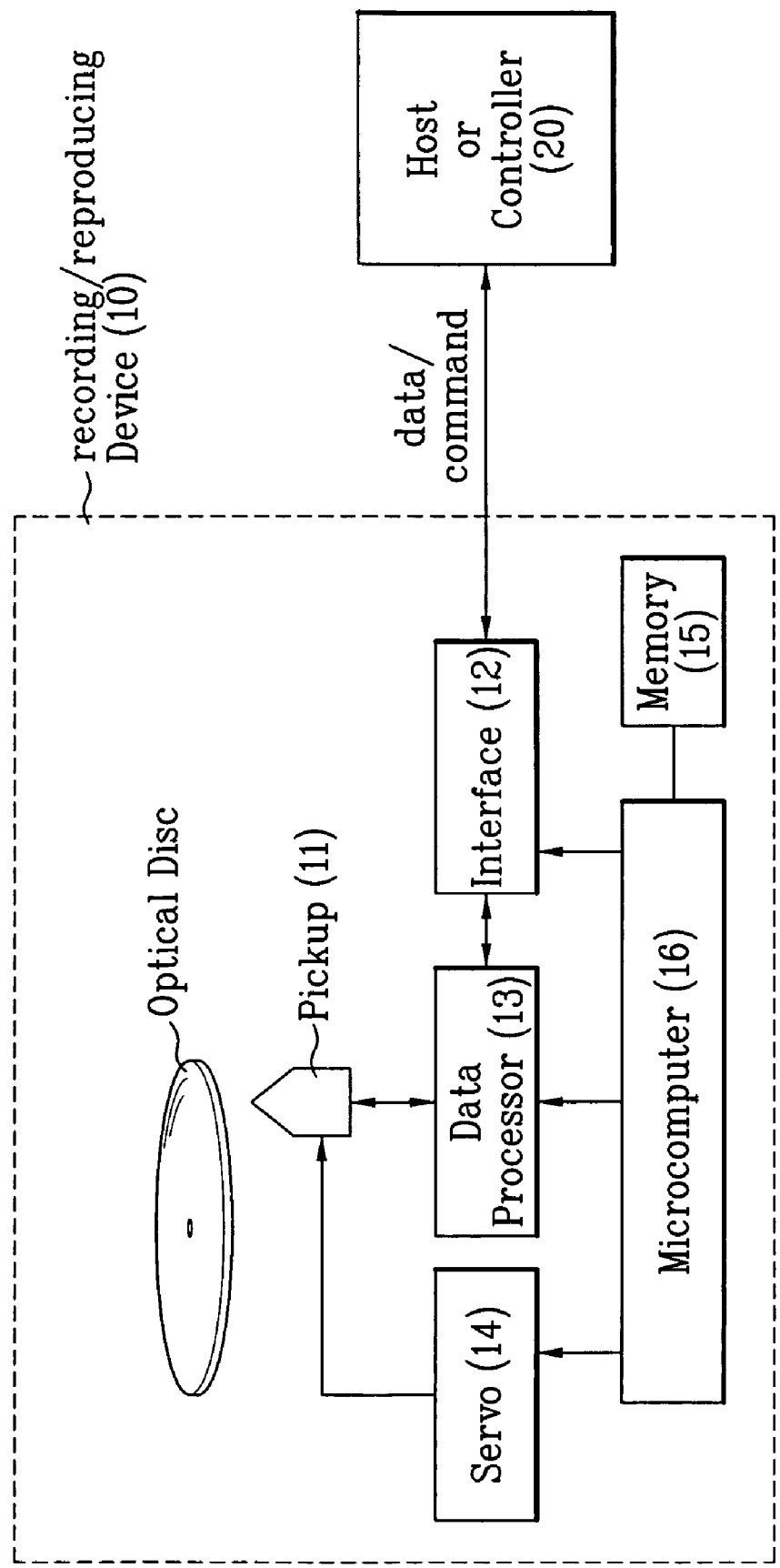
FIG. 16 illustrates an apparatus for recording/reproducing an optical disc write once according to the present invention.

FIG. 16 illustrates an apparatus for recording/reproducing an optical disc write once according to an embodiment of the present invention. The recording/reproducing apparatus includes a recording/reproducing device 10 for performing the recording/reproducing on the optical disc, and a controller 20 for controlling the device. The controller 20 for providing a recording/reproducing command to the recording/reproducing device 10 and the recording/reproducing device 10 performs the recording/reproducing on a specified area of the disc according to the command of the controller. The recording/reproducing device 10 comprises an interface 12 for performing a communication with the outside, an optical pickup 11 for recording or reproducing data on the disc, a data processor 13 for receiving the reproduced signal from the optical pickup to restore to a desired signal value, or modulating the signal to be recorded to a signal which can be recorded on the disc to transfer the modulated signal, a servo unit 14 for controlling the optical pickup 11 in order to accurately read the signal from the optical disc or to accurately write the signal on the disc, a memory 15 for temporarily storing various information including the management information and data, and a microcomputer 16 for controlling constituent elements of the recording/reproducing device.

During the recording operation, all the management information of the disc is read out and stored in the memory 15 of the recording/reproducing device, and the management information is used for the recording/reproducing operation on the optical disc. The controller 20, if it is required to record data in a specified area of the disc, transfers the positional information to the recording/reproducing device along with the data to be recorded. The microcomputer 16 in the recording/reproducing device 10 receives the recording command, and judges whether the area of the optical disc in which the controller 20 desires to record data is an already recorded area or a non-recorded area from the management information (especially, SBM information explained with reference to FIGS. 2 and 9) stored in the memory 15. If it is judged that the area is the non-recorded area, the microcomputer 16 performs the recording in accordance with the recording command of the controller 20, and if it is judged that the area is the already recorded area, the microcomputer 16 replacement-records the data in another area of the data area, so that the continuity of the user data area can be secured.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of managing overwrite on a write once optical disc, the disc including a user data area having a specified area where data is written therein, the method comprising:

in response to a request that the specified area having the data written therein be overwritten, writing replacement-recording data associated with the request, starting from a rear portion of the user data area;

recording, in a management area of the disc, first information indicating a last logical sector number of the user data area, wherein the last logical sector number has been changed in accordance with the replacement recording operation such that the recorded first information indicates a change in a size of the user data area according to the replacement recording operation; and recording second information indicating positions of the specified area and the replacement-recorded area portion, in the management area of the disc, wherein the writing step includes:

jumping to an area immediately before the end of the user data area in a non-sequential manner; and writing the replacement-recording data on the area immediately before the end of the user data area.

2. The method of claim 1, wherein the last logical sector number of the user data area is obtained by updating information on a previous last logical sector number of the user data area.

3. The method of claim 1, wherein the last logical sector number of the user data area is recorded as new management information while information on a previous last logical sector number of the user data area is maintained as it is.

4. The method of claim 1, wherein the optical disc is a dual-layer type write once optical disc, to which the method is applied in the same manner.

5. The method of claim 4, wherein the dual layers have user data areas consecutively given as one recording layer.

6. A method of managing overwrite on a write once optical disc, the disc including a user data area having a specified area where data is written therein, and an outer spare area, the method comprising:

when the specified area having the data written therein is requested to be overwritten, writing replacement-recording data to an area preceding the outer spare area of the disc;

extending a size of the outer spare area as large as a size of the area where the replacement-recording data is written in the writing step;

recording, in a management area of the disc, first information indicating a last logical sector number of the user data area, wherein the last logical sector number has been changed in accordance with the extension of the outer spare area such that the recorded first information indicates a change in a size of the user data area according to the extension of the outer spare area; and recording second information indicating positions of the specified area and the replacement-recorded area, in the management area of the disc, wherein the writing step includes:

jumping to the area preceding the outer spare area in a non-sequential manner; and writing the replacement-recording data on the area preceding the outer spare area.

7. A method of managing overwrite on a write once optical disc, the disc including a user data area having a specified area where data is written therein, and an outer spare area, the method comprising:

in response to a request that the specified area having the data written therein be overwritten, writing replacement-recording data to a replacement-recording area of the outer spare area of the disc;

determining whether or not to extend a size of the outer spare area in consideration of a size of the replacement-recording area; and recording, in a management area of the disc, first information indicating a last logical sector number of the user data area, wherein the last logical sector number has been changed in accordance with the determination of the extension of the outer spare area such that the recorded first information indicates a change in a size of the user data area according to the extension of the outer spare area; and recording, in the management area, second information indicating positions of the specified area and the replacement-recording area of the outer spare areas, wherein the writing step includes:

jumping to the replacement-recording area of the outer spare area in a non-sequential manner; and writing the replacement-recording data on the replacement-recording area of the outer spare area.

8. The method of claim 1, wherein the user data area is filled up with various replacement-recording data, first starting with the rear portion of the user data area and then areas of the user data area before the rear portion in a rear-to-front direction.

9. The method of claim 1, wherein the disc includes at least first and second recording layers, and the user data area extending from one portion in the first recording layer to another portion in the second recording area such that the rear portion of the user data area is physically located at a front area of a portion of the second recording area belong to the user data area.

10. The method of claim 6, wherein after the extending step, the outer spare area is defined to include a previous outer spare area and the area where the replacement-recording data is written in the writing step.

11. An apparatus for managing overwrite on a write once optical disc, the disc including a user data area having a specified area where data is written therein, the apparatus comprising:

in response to a request that the specified area having the data written therein be overwritten, a recording unit configured to write replacement-recording data associated with the request, starting from a rear portion of the user data area;

the recording unit further configured to record, in a management area of the disc, first information indicating a last logical sector number of the user data area, wherein the last logical sector number has been changed in accordance with the replacement recording operation such that the recorded first information indicates a change in a size of the user data area according to the replacement recording operation; and the recording unit further configured to record second information indicating positions of the specified area and the replacement-recorded area portion, in the management area of the disc, wherein to write the replacement-recording data, the recording unit jumps to an area immediately before the end of the user data area in a non-sequential manner, and writes the replacement-recording data on the area immediately before the end of the user data area.

12. The apparatus of claim 11, wherein the last logical sector number of the user data area is obtained by updating information on a previous last logical sector number of the user data area.

13. The apparatus of claim 11, wherein the last logical sector number of the user data area is recorded as new management information while information on a previous last logical sector number of the user data area is maintained as it is.

14. The apparatus of claim 11, wherein the user data area is filled up with various replacement-recording data, first starting with the rear portion of the user data area and then areas of the user data area before the rear portion in a rear-to-front direction.

15. The apparatus of claim 11, wherein the disc includes at least first and second recording layers, and the user data area extending from one portion in the first recording layer to another portion in the second recording area such that the rear portion of the user data area is physically located at a front area of a portion of the second recording area belong to the user data area.

16. An apparatus for managing overwrite on a write once optical disc, the disc including a user data area having a specified area where data is written therein, and an outer spare area, the apparatus comprising:

when the specified area having the data written therein is requested to be overwritten, a recording unit configured to write replacement-recording data to an area preceding the outer spare area of the disc;

the recording unit further configured to extend a size of the outer spare area as large as a size of the area where the replacement-recording data is written;

the recording unit further configured to record, in a management area of the disc, first information indicating a last logical sector number of the user data area, wherein the last logical sector number has been changed in accordance with the extension of the outer spare area such that the recorded first information indicates a change in a size of the user data area according to the extension of the outer spare area; and the recording unit further configured to record second information indicating positions of the specified area and the replacement-recorded area, in the management area of the disc, wherein to write the replacement-recording data, the recording unit jumps to the area preceding the outer spare area in a non-sequential manner, and writes the replacement-recording data on the area preceding the outer spare area.

17. The apparatus of claim 16, wherein after the size of the outer spare area has been extended, the outer spare area is defined to include a previous outer spare area and the area where the replacement-recording data is written.

18. A computer-readable storage medium, comprising:

a user data area having a specified area where data is written therein; and a management area, wherein in response to a request that the specified area be overwritten, replacement-recording data associated with the request is written starting from a rear portion of the user data area, wherein first information indicating a last logical sector number of the user data area is written in the management area, where the last logical sector number has been changed in accordance with the replacement recording operation such that the recorded first information indicates a change in a size of the user data area according to the replacement recording operation, wherein second information indicating positions of the specified area and the replacement-recorded area portion is written in the management area, and wherein to write the replacement-recording data. an area immediately before the end of the user data area is found by jumping to that area in a non-sequential manner, and the replacement-recording data is written on the area immediately before the end of the user data area.

* * * * *